`2,865,942`

PHOSPHOROUS ACID ESTERS AND METHOD OF MAKING SAME

David H. Chadwick and Theodor Reetz, Anniston, Ala., assignors to Monsanto Chemical Company, a corporation of Delaware No Drawing. Application October 19, 1953
Serial No. 387,031

7 Claims. (Cl. 260—461)

This invention relates to a method of producing trialkyl, tricycloalkyl and triaralkyl esters of phosphorous acid and more particularly to a method of recovering these esters from mixtures containing same.

An object of the invention is to provide an economically and commercially practical method of producing and recovering phosphorous acid esters defined by the following general formula:

$$P(OR)_3$$

wherein R represents the same or different radicals selected from the group consisting of alkyl, cycloalkyl and aralkyl radicals containing from 1 to 20 carbon atoms.

Another object of the invention is to provide an improved method of preparing trialkyl esters of phosphorous acid containing a total of from 3 to 12 carbon atoms per mol, which eliminates the necessity of filtering the amine hydrohalide formed in the reaction and then liberating the amine by decomposing the salt in a separate operation.

A further object of the invention is to provide a novel method of producing trialkyl esters of phosphorous acid containing a total of from 3 to 12 carbon atoms per mol in good yields and in a substantially pure form.

A still further object of the invention is to provide a novel method of removing the partial alkyl esters of phosphorous acid from mixtures thereof with trialkyl esters of this acid.

Other objects and advantages will appear hereinafter as the description of the invention proceeds.

It is known in the art that triesters of phosphorous acid may be prepared by reaction substantially three mols of an alcohol with about one mol of a trihalide selected from the group consisting of phosphorus trichloride and phosphorus tribromide. This reaction is carried out in the presence of an inert organic solvent and a tertiary amine which is effective to take up hydrogen halide formed in the reaction. This method is subject to a number of serious disadvantages which render it commercially unattractive. For example, this method requires the removal of the amine hydrohalide and this introduces substantial operational difficulties and product losses due to the large amount of amine hydrohalide formed per pound of product, the retention of the product in the filter cake and the hygroscopicity of the hydrohalide. Moreover, it necessitates the use of a separate operation for recovering the amine from the hydrohalide salt and this greatly increases the overall cost of manufacturing these products.

We have developed a method of producing and recovering trialkyl, tricycloalkyl and triaralkyl phosphites which eliminates the difficulties and disadvantages of the known method described above. In accordance with this method, a phosphorus trihalide such as $PCl_3$ or $PBr_3$ is reacted with an alcohol in the presence of an inert solvent and a tertiary amine to form a triester of phosphorous acid in accordance with the following equation:

$$PX_3 + 3HOR + 3(R')_3N \xrightarrow{Solvent} P(OR)_3 + 3(R')_3N.3HX$$

wherein R is an alkyl, cycloalkyl or an aralkyl radical, R' is a straight chain, branched chain or cyclic hydrocarbon radical and X is a halogen atom selected from the group consisting of chlorine and bromine. The solution of triester containing the hydrohalide salt is treated with a sufficient amount of a dilute alkaline solution to liberate the tertiary amine and form the corresponding alkaline halide salt. This results in the production of a product which separates into two layers, namely, an aqueous layer containing alkaline halide and an organic layer containing trisubstituted esters, inert solvent and tertiary amine. This organic layer is separated from the aqueous layer and fractionally distilled to separate the ester from the solvent and amine.

The method of the instant invention is an improvement over the known one described earlier herein in that it avoids filtration of the amine hydrohalide salt, the separate operation of recovering the amine from the hydrohalide salt and also effects a certain amount of purification by hydrolysis of the dialkyl esters and solution in the aqueous layer. The effectiveness of this method is dependent upon the fact that the triesters of phosphorous acid are not rapidly hydrolyzed and dissolved in aqueous alkaline solutions, as compared to water itself, and to the high partition coefficient of tertiary amines in organic solvents and these aqueous alkaline solutions. Thus, the amine hydrohalide is easily separated; the amine readily regenerated, recovered and reused; and the purity of the triester is improved.

The following examples illustrate the improved process of this invention.

EXAMPLE I

*Trimethyl phosphite*

A mixture of 200 cc. of phenyl cyclohexane, 54.4 grams of methanol and 314 grams of tributylamine was prepared and cooled with a dry ice bath to a temperature below 0° C. Then 68.7 grams of phosphorus trichloride dissolved in 50 cc. of phenyl cyclohexane was added slowly over a period of one hour to the mixture while maintaining the temperature thereof below 0° C. The mixture was held at 0° C. for 1 hour after the addition, then warmed to room temperature for ¾ hour and finally cooled to 0° C. To the cooled reaction product, 350 cc. of cold water containing 60 grams of sodium hydroxide was added to decompose the amine hydrochloride. This resulted in the production of an aqueous layer of sodium chloride and a phenyl cyclohexane layer containing trimethyl phosphite and tributylamine. After drying the phenyl cyclohexane layer with calcium sulfate, the trimethyl phosphite content thereof was separated by distillation in a yield corresponding to about 72% of theory, basis $PCl_3$.

EXAMPLE II

*Triisopropyl phosphite*

A solution of 40 grams (0.66 mol) of isopropyl alcohol and 66.6 grams (0.6 mol) of triethylamine in 250 cc. benzene was introduced into a three-necked, round bottom flask equipped with a stirrer, a thermometer, dropping funnel and condenser. To this solution was added about 27.5 grams (0.2 mol) of phosphorus trichloride dissolved in 225 cc. of benzene, the addition taking place over a period of about 1½ hours while the reaction mass was kept at about 15° C. The reaction mixture was stirred for two hours while maintaining the temperature at 25° C. and then about 25 grams (0.625 mol) of sodium hydroxide dissolved in 125 cc. of water was added with stirring. This resulted in the production of an aqueous layer and an organic layer which was separated, dried and subjected to distillation. After separating the benzene and triethylamine by distillation, a fraction was obtained from the organic layer which boiled at 62°–62.5° C. at 15–20 mm. Hg. This fraction contained triisopropyl phosphite in a yield corresponding to 82% of theory, basis PCl₃.

EXAMPLE III

*Tri-n-butyl phosphite*

A mixture of 500 cc. of benzene, 171.5 grams (1.7 mols) of triethylamine and 112.0 grams (1.5 mols) of n-butyl alcohol was cooled to 0° C. with a Dry Ice-methanol bath. To this mixture 68.7 grams (0.5 mol) of phosphorus trichloride was added slowly with vigorous agitation and during the addition the reaction temperature was maintained below 10° C. Upon completing the addition, the reaction mixture was heated to 30–35° C. for a period of about 1 hour whereupon 63 grams (1.57 mols) of NaOH in 350 cc. of water was introduced, with vigorous stirring, into the reaction mixture. This resulted in the separation of the reaction mixture into an aqueous layer containing sodium chloride and an organic layer containing benzene, tri-n-butyl phosphite and triethylamine. The organic layer was separated from the aqueous layer and dried with 100 grams of calcium sulfate. After drying the organic layer, the dried product was distilled at atmospheric pressure to separate the benzene and triethylamine from the ester. Then the distillation residue was subjected to distillation under reduced pressure and about 110 grams (88.5% yield) of tri-n-butyl phosphite distilling at 128–130° C. at 12.2 mm. Hg was obtained.

EXAMPLE IV

*Tri-2-ethylhexyl phosphite*

325 cc. of benzene, 171.5 grams of triethylamine and 202 grams of 2-ethylhexyl alcohol were mixed together and cooled to 0° C. with a Dry Ice-methanol bath. To this mixture, 68.7 grams of phosphorus trichloride dissolved in 150 cc. of benzene was slowly added with vigorous agitation and during the addition the reaction temperature was maintained below 10° C. Upon completing this operation, the reaction mixture was heated to 30–35° C. for a period of about 1 hour and then 61 grams of sodium hydroxide in 350 cc. of water was introduced with vigorous stirring. This resulted in the separation of an aqueous layer containing sodium chloride and a benzene layer containing tri-2-ethylhexyl phosphite and triethylamine. The benzene layer was separated from the aqueous layer and dried with 100 grams of calcium sulfate. The dried product was subjected to distillation at atmospheric pressure to separate the benzene and triethylamine and then under reduced pressure to separate 2-ethylhexyl phosphite in a substantially pure form. This ester was recovered in a yield corresponding to about 92% of theory.

EXAMPLE V

*Tri-tridecyl phosphite*

The procedure described in the preceding example was repeated except that tridecyl alcohol was used in place of 2-ethylhexyl alcohol and the product after separation of the benzene and triethylamine was treated with decolorizing charcoal instead of being subjected to vacuum distillation. As a result of this procedure, tri-tridecyl phosphite was recovered in a yield corresponding to about 86% of theory, basis PCl₃.

EXAMPLE VI

*Tri-"Nopol" phosphite*

49.8 grams (1.3 mols) of "Nopol" was reacted with 13.7 grams (0.1 mol) of phosphorus trichloride in the presence of 31 grams (0.3+ mol) of triethylamine and about 200 cc. of ether, the reaction being carried out at the reflux temperature of the ether in a reaction time of about 30 minutes. The reaction mixture was treated with excess sodium hydroxide solution in order to decompose the amine hydrochloride formed. This resulted in the production of an aqueous layer containing sodium chloride and an ether layer containing tri-"Nopol" phosphite and triethylamine. The ether layer was dried, distilled to separate the ether and triethylamine from the product and then was further purified by filtering with activated charcoal. 51.9 grams of tri-"Nopol" phosphite was recovered in a yield of about 99% of theory, basis PCl₃.

"Nopol" is a bicylic alcohol formed by the condensation of formaldehyde and beta pinene in molar proportions (J. A. C. S., vol. 68, page 638, 1946).

EXAMPLE VII

*Tris(β-dimethylaminoethyl)phosphite*

133.5 grams (1.5 mols) of N,N-dimethylethanolamine was reacted with 68.7 grams (0.5 mol) of PCl₃ in the presence of 700 cc. of benzene, the reaction being initiated at a temperature of about 10–20° C. and being completed at the reflux temperature of the benzene. The reaction mixture was washed with 60 grams of sodium hydroxide dissolved in 400 cc. of water and the resulting aqueous solution separated. The residual organic layer was dried with anhydrous calcium sulfate, filtered to remove the hydrated calcium sulfate and subjected to distillation at atmospheric pressure to separate the benzene. Upon completing this operation, the product was distilled under a reduced pressure of .8 mm. of mercury and a product boiling at 108° C. was collected in good yield. On analysis, this product was found to be tris(β-dimethylaminoethyl)phosphite.

The instant invention is not restricted to triesters of phosphorous acid prepared by reacting PCl₃ or PBr₃ with aliphatic, cycloaliphatic or aralphatic alcohols, but it is also applicable to producing and recovering triesters formed in accordance with the following reactions.

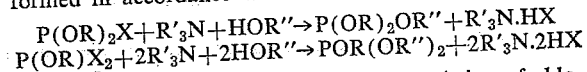

wherein X is selected from the group consisting of chlorine and bromine, R' has the same significance as set forth above and R and R'' represent the same or different radicals selected from the group consisting of alkyl, cycloalkyl and aralkyl radicals containing from 1 to 20 carbon atoms.

The instant invention is also directed to the production and recovery of triesters of phosphorous acid prepared by reaction PCl₃, PBr₃ or derivatives thereof with aliphatic, cycloaliphatic or aralphatic alcohols containing a tertiary amino group, the reaction being carried out in the presence of an inert solvent, preferably an inert organic solvent. In this modification of the invention, the alcohol enters into the reaction with the phosphorus halide to form the triester and at the same time serves as a hydrogen halide acceptor. The reactions involved in this embodiment of the invention may be represented as follows:

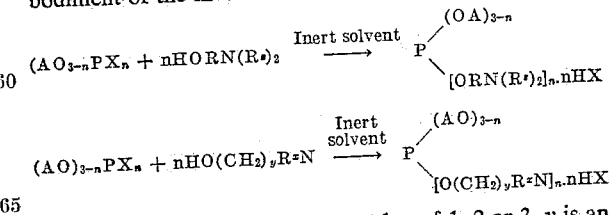

wherein $n$ is an integer having a value of 1, 2 or 3, $y$ is an integer, X and R have the same significance as stated above, R$^z$ is an aliphatic, cycloaliphatic, alkaryl, aryl or aralkyl radical, R$^x$ is cyclic hydrocarbon radical and A is a member selected from the group consisting of alkyl, cycloalkyl, aralkyl hydrocarbon radicals and also the same radicals which contain a tertiary amino group.

The solution of ester-amine containing the combined hydrogen halide is treated with a sufficient amount of a dilute alkaline solution to liberate the ester-amine and form the corresponding alkaline halide salt. This product separates into an aqueous layer containing the alkaline halide salt and an organic layer containing the triester which is recovered by distillation or in any other suitable manner.

The reaction defined in the above equations may be carried out at a temperature ranging from about −20° C. up to that temperature at which substantial decomposition of the phosphorous acid ester or ester amine is avoided. More specifically, the reaction may be carried out at a temperature within the range of about −20° C. to about 85° C. and within these limits, a temperature of from −10° C. to 40° C. is preferred.

In carrying out these reactions, the reactants are employed in a molar ratio of alcohol to the phosphorus halide [$PX_3$; $P(OR)X_2$; or $P(OR)_2X$] of from about 3:1 to about 1:1, the ratio depending upon the number of halogen atoms, but in each case up to 30 molar percent or a larger excess may be employed, if desired. In general, it is desirable to use a slight excess of the alcohol in order to insure substantially complete conversion of the phosphorus halide to the desired ester.

The reaction is carried out in the presence of an inert solvent, preferably an inert organic solvent which may boil at relatively low or relatively high temperatures. Illustrative examples of solvents which may be used in the practice of this invention are benzene, toluene, cyclohexane, methylcyclohexane, pentane, hexane, heptane, carbon tetrachloride, dodecahydrobiphenyl, kerosene, decahydronaphthalene, tetrahydronaphthalene, amyl benzene, p-cymene, o-cymene, m-cymene, n-dodecyl benzene, N-heptylcyclopentane, etc. and partially hydrogenated aromatic hydrocarbon liquid mixtures, obtained by the partial catalytic hydrogenation of the mixture of normally solid aromatic hydrocarbons which boil above about 340° C. at 760 mm. pressure and are formed in the synthesis of biphenyl by the pyrolysis of benzene at elevated temperatures (2,364,719 to Jenkins).

In the practice of the instant invention, the tertiary amines are employed in an amount at least equivalent to the hydrogen halide liberated in the reaction, but slightly lower or substantially larger proportions may be used, if desired. Illustrative examples of tertiary amines which are suitable for reacting with the liberated hydrogen halide are triethylamine, tri-n-butylamine, trimethylamine, dimethylaniline, pyridine, 2-picoline, 3-picoline, quinoline, 2,6-lutidine, 2,4-lutidine, N,N-diethylethanolamine, N,N,-diethylpropanolamine, N,N-dimethylpropanolamine, N,N-methylethylethanolamine, ethyl β-hydroxyethylaniline, methyl β-hydroxyethylaniline, p-dimethylamino-benzyl alcohol and 4-dimethylamino-cyclohexanol, etc.

The decomposition of the tertiary amine hydrohalide salt is accomplished by means of an aqueous solution of an alkali which will combine with the hydrogen halide and form a water soluble compound. Illustrative examples of suitable alkalis are the oxides, hydroxides, bicarbonates and carbonates of the alkali metals, particularly sodium, potassium and lithium; ammonia and calcium hydroxide, and mixtures of two or more of these alone or in combination with the corresponding soluble halide salt. Of these alkalis, a mixture of sodium hydroxide and sodium chloride is preferred and such a mixture may be produced by addition of dilute sodium hydroxide to the reaction mixture with or without the addition of sodium chloride.

In decomposing the tertiary amine hydrohalide salt, the aqueous alkaline solution is employed in an amount and in a concentration sufficient to substantially completely decompose the salt and at the same time provide a product that is sufficiently dilute to permit the reaction mixture to separate into an organic layer and an aqueous layer containing substantially all of the by-product alkaline halide dissolved therein. In general, it is convenient and practicable to use a 10% to 25% alkaline solution, but higher or lower concentrations are also within the scope of the invention.

What we claim is:

1. A process of recovering a triester of phosphorous acid from a reaction mixture containing said (a) triester (b) a tertiary amine hydrohalide salt selected from the group consisting of a hydrochloride and a hydrobromide salt, and (c) an inert solvent which comprises adding an aqueous solution of an alkali hydroxide in an amount sufficient to substantially decompose said hydrohalide salt of said tertiary amine with the formation of the corresponding halide of the alkali, separating the resulting reaction mixture into (1) an aqueous layer containing said halide and an (2) organic layer containing said ester, said tertiary amine, and said solvent, and thereafter recovering said ester from said organic layer.

2. A process of recovering a triester of phosphorous acid from a reaction mixture containing said (a) triester, (b) a tertiary amine hydrochloride salt, and (c) an inert solvent which comprises adding an aqueous solution of an alkali hydroxide in an amount sufficient to substantially decompose said hydrochloride salt of said tertiary amine with the formation of the corresponding halide of the alkali, separating the resulting reaction mixture into (1) an aqueous layer containing said halide and an (2) organic layer containing said ester, said tertiary amine, and said solvent.

3. The process of claim 2 in which the triester of phosphorous acid is trimethyl phosphite.

4. The process of claim 2 in which the triester of phosphorous acid is triisopropyl phosphite.

5. The process of claim 2 in which the triester of phosphorous acid is tri-n-butyl phosphite.

6. The process of claim 2 in which the triester of phosphorous acid is tri-2-ethylhexyl phosphite.

7. The process of claim 2 in which the triester of phosphorous acid is tri-tridecyl phosphite.

References Cited in the file of this patent

UNITED STATES PATENTS

| | | |
|---|---|---|
| 2,226,552 | Conary et al. | Dec. 31, 1940 |
| 2,408,744 | Engel | Oct. 8, 1946 |
| 2,495,958 | Craig et al. | Jan. 31, 1950 |